United States Patent [19]

Slack

[11] Patent Number: 4,910,333
[45] Date of Patent: Mar. 20, 1990

[54] LIQUID DIPHENYLMETHANE DIISOCYANATE COMPOSITIONS

[75] Inventor: William E. Slack, Moundsville, W. Va.

[73] Assignee: Mobay Corporation, Pittsburgh, Pa.

[21] Appl. No.: 57,466

[22] Filed: Jun. 3, 1987

[51] Int. Cl.$^4$ .............................................. C07C 69/00
[52] U.S. Cl. ..................................... 560/351; 560/359
[58] Field of Search ................................ 560/351, 359

[56] References Cited

U.S. PATENT DOCUMENTS

| | | | |
|---|---|---|---|
| 3,152,162 | 10/1964 | Fischer et al. | 260/453 |
| 3,384,653 | 5/1968 | Erner et al. | 260/453 |
| 3,394,165 | 7/1968 | McClellan et al. | 260/453 |
| 3,449,256 | 6/1969 | Farrissey, Jr. | 252/182 |
| 3,640,966 | 2/1972 | Hennig et al. | 260/77.5 |
| 3,641,093 | 2/1972 | Brooks et al. | 260/453 |
| 3,644,457 | 2/1972 | Konig et al. | 260/453 |
| 3,674,828 | 7/1972 | Brooks et al. | 260/453 |
| 3,701,796 | 10/1972 | Saaty et al. | 260/453 |
| 3,883,571 | 5/1975 | Allport et al. | 260/453 |
| 4,014,935 | 3/1977 | Ibbotson | 260/566 |
| 4,031,026 | 6/1977 | Ibbotson | 252/182 |
| 4,055,548 | 10/1977 | Carleton et al. | 260/77.5 |
| 4,088,665 | 5/1978 | Findeisen et al. | 260/453 |
| 4,102,833 | 7/1978 | Salisbury | 521/159 |
| 4,115,429 | 9/1978 | Reiff et al. | 260/453 |
| 4,118,411 | 10/1978 | Reiff et al. | 260/453 |
| 4,154,752 | 5/1979 | Sundermann et al. | 260/453 |
| 4,177,205 | 12/1979 | Schaaf et al. | 260/453 |
| 4,229,347 | 10/1980 | Holt et al. | 260/239 |
| 4,261,852 | 4/1981 | Carroll et al. | 528/59 |
| 4,321,333 | 3/1982 | Alberino et al. | 521/159 |
| 4,332,742 | 6/1982 | Allen | 260/453 |
| 4,442,235 | 4/1984 | Taylor et al. | 521/122 |
| 4,490,300 | 12/1984 | Allen et al. | 260/453 |
| 4,490,301 | 12/1984 | Pantone et al. | 260/453 |
| 4,490,302 | 12/1984 | Ma et al. | 260/453 |
| 4,539,156 | 9/1985 | Dewhurst et al. | 260/453 |
| 4,539,157 | 9/1985 | Dewhurst et al. | 260/453 |
| 4,539,158 | 9/1985 | Dewhurst et al. | 260/453 |

*Primary Examiner*—Alan Siegel
*Attorney, Agent, or Firm*—Joseph C. Gil

[57] ABSTRACT

The present invention is directed to a process for the production of an isocyanate which is both stable and liquid at 25° C. comprising reacting (i) diphenylmethane diisocyanate,
(ii) an organic material containing two or more hydroxy groups, said organic material forming a product solid at 25° C. when reacted with diphenylmethane diisocyanate in an amount such that the resultant solid product would have an isocyanate group content of from 10 to 30% by weight, and
(iii) from 1 to 6% by weight, based on the combined weight of (i), (ii) and (iii), of tripropylene glycol, the amounts of components (i), (ii) and (iii) being such that the resultant product has an isocyanate group content of from about 10 to 30% by weight.

7 Claims, No Drawings

LIQUID DIPHENYLMETHANE DIISOCYANATE COMPOSITIONS

This invention relates to organic isocyanates based on diphenylmethane diisocyanates which are liquid at 25° C. This invention also creates to a process for preparing these isocyanates.

BACKGROUND OF THE INVENTION

Diisocyanates which are liquid at room temperature have numerous advantages over solid diisocyanates. Diisocyanates which are liquid at room temperature, such as toluene diisocyanate or hexamethylene diisocyanate, are, as a rule, physiologically harmful because of their high vapor pressure. For this reason, various attempts have been made to start with diisocyanates that are solid at room temperature and convert these into liquid form.

The most commercially important diisocyanates which are solid at room temperature are 4,4'-diphenylmethane diisocyanate and the 2,4'-isomer thereof, which melt at 39° C. and 34.5° C., respectively.

Numerous patents have issued relating to the liquification of diphenylmethane diisocyanate. See, for example, U.S. Pat. Nos. 3,152,162; 3,384,653; 3,394,165; 3,449,256: 3,640,966: 3,641,093; 3,674,828; 3,701,796; 3,883,571: 4,014,935: 4,055,548; 4,088,665; 4,031,026; 4,102,833; 4,115,429: 4,118,411: 4,154,752; 4,177,205; 4,229,347: 4,261,852; 4,321,333; 4,332,742; 4,490,300; 4,490,301; 4,490,302, 4,539,156; 4,539,157: and 4,539,158.

U.S. Pat. No. 3,644,457 (noted above) describes reacting 4,4'- and/or 2,4'-diphenylmethane diisocyanate with a branched aliphatic dihydroxy compound to produce a product which is liquid at room temperature. According to this reference, 1 mol of a diphenylmethane diisocyanate is reacted with from about 0.1 to about 0.3 mols of poly-1,2-propylene ether glycol to form a liquid product.

Liquid diphenylmethane diisocyanates have been produced by reacting diisocyanate having specified 2,4'-isomer contents with propylene and polypropylene glycols and with polyoxyethylene glycols (see, e.g., U.S. Pat. Nos. 4,118,411 and 4,115,429).

It has also been proposed to prepare liquid diphenylmethane diisocyanate compositions by reacting the diisocyanates with three separate alkylene glycols, each having at least three carbon atoms (see, e.g., U.S. Pat. No. 3,883,571), or by reacting the diisocyanate with at least three separate alkylene glycols, each having a least three carbon atoms, and wherein at least one of the glycols is dipropylene, tripropylene, or polypropylene glycol (see, e.g., U.S. Pat. No. 4,229,347).

Isocyanates based on diphenylmethane diisocyanate, tripropylene glycol and either a sucrose initiated polyether or a propoxylated glycerine are also known (see U.S. Pat. No. 4,442,235; note particularly Polyisocyanates I and J, columns 11 and 12).

It is an object of this invention to provide improved organic isocyanates which are liquid at 25° C. A further object of this inention is to provide organic isocyanates which remain liquid even on prolonged storage. Still another object of this invention is to provide an improved process for preparing liquid organic isocyanates.

DESCRIPTION OF THE INVENTION

The present invention is directed to a process for preparing liquid modified isocyanates comprising reacting (i) diphenylmehane diisocyanate, (ii) an organic material containing two or more hydroxyl groups, said organic material forming a product solid at 25° C. when reacted with diphenylmehane diisocyanate in an amount such that the resultant solid product would have an isocyanate group content of from 10 to 30% by weight, and (iii) from 1 to 6% by weight, based on the combined weight of (i), (ii) and (iii), of tripropylene glycol. The amounts of (i), (ii) and (iii) are such that the resultant product, which is both stable and liquid at 25° C., has an isocyanate group content of from about 10 to about 30% by weight. The tripropylene glycol may be added before, during or after the reaction of the isocyanate (i) and the organic hydroxyl group containing material (ii). The reaction of the components is generally conducted at a temperature of from about 20° C. to about 110° C., preferably between about 40° C. and about 80° C., and most preferably between about 50° and about 70° C., in a ratio such that the product has an isocyanate group content of from about 10 to about 30 percent by weight, and preferably of from about 20 to about 30 percent by weight, and most preferably from about 20 to about 25 percent by weight. The instant invention is also directed to isocyanates which are both stable and liquid at room temperature, prepared according to the above-noted process.

As used herein, the phrase "diphenylmethane diisocyanate" means 2,2'-diphenylmethane diisocyanate, 2,4'-diphenylmethane diisocyanate, 4,4'-diphenylmethane diisocyanate and mixtures thereof.

The organic hydroxy group containing material can be essentially any hydroxy group containing material which, when reacted with diphenylmethane diisocyantte in an amount such that the product has an NCO content of from 10 to 30%, forms a product which is solid at 25° C. The present invention is directed to the discovery that tripropylene glycol when used in combination with such a hydroxy containing material leads to a liquid product.

The liquid isocyanates which can be prepared according to the invention have a very low viscosity and can therefore be processed very easily, such as by casting or metering through pumps. Additionally, they have a very low vapor pressure and are, therefore, less physiologically harmful.

In general, the isocyanate content of the product of the process amounts to from about 10 to 30 percent by weight and preferably from about 20 to about 30 percent by weight, and most preferably, from about 20 to about 25 percent by weight.

The product of the present invention can be used for many different polyadition reactions in the lacquer and plastics industry. For example, they may be used in the production of polyurethane foams and elastomers, such as in reaction injection molding (RIM) products.

The invention is further illustrated, but is not intended to be limited by the following examples in which all parts and percentages are by weight unless otherwise specified.

EXAMPLES

In the Examples which follow, the following materials were used:

POLYOL A: the reaction product of one mole of resorcinol and two moles of propylene oxide, having a molecular weight of 226.

POLYOL B: the reaction product of one mole of POLYOL A and 0.63 mole of diphenylcarbonate, having a molecular weight of 596.

POLYOL C: the reaction product of one mole of POLYOL A and 0.67 mole of diphenylcarbonate, having a molecular weight of 682.

POLYOL D: the reaction product of one mole of POLYOL A and 0.72 mole of diphenylcarbonate, having a molecular weight of 754.

POLYOL E: the reaction product of one mole of tripropylene glycol and 0.76 mole of diphenylcarbonate, having a molecular weight of 69.

POLYOL F: the reaction product of one mole of tripropylene glycol and 0.67 mole of diphenylcarbonate, having a molecular weight of 1122.

POLYOL G: the reaction product of one mole of dipropylene glycol and 0.56 mole of diphenylcarbonate, having a molecular weight of 1086.

POLYOL H: the reaction product of one mole of dipropylene glycol and 0.33 mole of diphenylcarbonate, having a molecular weight of 686.

POLYOL I: the reaction product of hexanediol and diphenylcarbonate, having a molecular weight of 1680.

POLYOL J: the reaction product of trimethylolpropane and propylene oxide having a molecular weight of 455.

MDI: an isocyanate containing 95% by weight or more of 4,4'-diphenylmethane diisocyanate, with remaining material being the 2,4'- and the 2,2'-isomer (isocyanate group content of 33.6% by weight).

PG: Propylene glycol.

DPG: Dipropylene glycol.

TPG: Tripropylene glycol.

POLYOL K: the reaction product of propylene glycol and propylene oxide having a molecular weight of 1000.

POLYOL L: the reaction product of propylene glycol and propylene oxide having a molecular weight of 425.

TEG: Triethylene glycol.

POLYOL M: the reaction product of one mole of Bisphenol A-di(-hydroxypropyl) ether and 0.71 mole of diphenylcarbonate, having a molecular weight of 908.

POLYOL N: the reaction product of one mole of phenolphthalein and two moles of propylene oxide having a molecular weight of 434.

POLYOL O: the reaction product of propylene glycol and propylene oxide having a molecular weight of 2000.

POLYOL P: the reaction product of glycerine and propylene oxide having a molecular weight of 3000.

POLYOL Q: a glycerin started propylene oxide/ethylene oxide (weight ratio of propylene oxide to ethylene oxide 90:10) mixed polyether polyol having a molecular weight of 3740.

POLYOL R: the reaction product of trimethylolpropane and propylene oxide having a molecular weight of 3950.

POLYOL S: a glycerine started propylene oxide/ethylene oxide (a 50:50 weight ratio of propylene oxide to ethylene oxide) mixed polyether polyol having a molecular weight of 6000.

POLYOL T: a propylene glycol started propylene oxide/ethylene oxide (an 80:20 weight ratio of propylene oxide to ethylene oxide) mixed polyether polyol having a molecular weight of 4000.

POLYOL W: a glycerine started propylene oxide/ethylene oxide (an 87:13 weight ratio of propylene to ethylene oxide) mixed polyether polyol having a molecular weight of 4800.

In the examples, Examples 1, 4 through 11, 12, 16, 18, 20, 22 through 29, 30, 33, 36, 37, 39, 40 and 43, 45, 47, 49, 51, 53, 55 and 57 are comparative examples.

EXAMPLE 1

122.4 parts of MDI were charged to reactor and heated to 60° C. 24.7 parts of POLYOL A were added to the reaction over a period of about 10 minutes. The mixture was held at about 60° for about 2 hours and then cooled to room temperatures. The resultant product, which had an isocyanate group content of about 21%, formed a cloudy paste after a period of two days at room temperature.

EXAMPLE 2

153 parts of MDI were charged to a reactor and heated to 45° C. 2.6 parts of TPG (corresponding to about 1.4% by weight of the total reaction mixture) were then added, followed by the addition of 27.8 parts of POLYOL A over a 7 minute period. The mixture was held at about 70° C. for 20 minutes and was then cooled to room temperature. The resultant product, which had an isocyanate group content of about 21% remained a liquid after a period of more than 5 days at room temperature.

EXAMPLE 3

3159 parts of MDI were charged to a reactor and heated to 40° C. 140 parts of TPG was then added over a 4 minute period. The temperature was held at from 43 to 50° C. for about 1 hour. 375 parts of POLYOL A were then added over a 45 minute period. The temperature was maintained at about 60° C. for about one hour. The TPG amounted to about 3.8% by weight of the total reaction mixture. The resultant product, which had an isocyanate group content of about 23%, remained a liquid after more than three months at room temperature.

EXAMPLES 4 THROUGH 11

In these examples, various propylene glycols (other than tripropylene glycol) were used in attempts to form liquid products. The materials used, the amounts used, and the character of the resultant product were as indicated in Table I. In each of Examples 4 through 11, the MDI was first heated to about 45° C. in a glass jar. Thereafter the other components were added and allowed to react. The jars were then stored at room temperature.

TABLE I

| EXAMPLE | MDI PBW | POLYOL A PBW | POLYOL K PBW | POLYOL L PBW | DPG PBW | PG PBW | % by weight of POLYOL K, POLYOL L, DPG or PG | RESULT |
|---|---|---|---|---|---|---|---|---|
| 4 | 86 | 10.2 | 3.8 | — | — | — | 3.8% | Began gel in 23 days Mostly gel in 67 days |

TABLE I-continued

| EXAMPLE | MDI PBW | POLYOL A PBW | POLYOL K PBW | POLYOL L PBW | DPG PBW | PG PBW | % by weight of POLYOL K, POLYOL L, DPG or PG | RESULT |
|---|---|---|---|---|---|---|---|---|
| 5 | 86 | 10.2 | 18.8 | — | — | — | 16.4% | Began to cloud in 67 days. After a total of 108 days, product was a clear liquid with white swirls. |
| 6 | 86 | 10.2 | — | 3.8 | — | — | 3.8% | Began gelling in 30 days. Fully gelled in 67 days. |
| 7 | 86 | 10.2 | — | 7.9 | — | — | 7.6% | Began gelling in 49 days. 80% gel after 106 days. |
| 8 | 86 | 10.2 | — | — | 3.8 | — | 3.8% | Immediately from hazy white suspension, with no change after 108 days. |
| 9 | 86 | 10.2 | — | — | 2.7 | — | 2.7% | Same as Example 8. |
| 10 | 86 | 10.2 | — | — | — | 3.8 | 3.8% | A complete solid after 16 days. |
| 11 | 86 | 10.2 | — | — | — | 1.5 | 1.5% | Gel formation began after 18 days and a complete solid after 67 days. |

In Example 5, a liquid was formed which had white swirls. However, a very large amount of POLYOL K was required to even attain that result.

EXAMPLES 12 AND 13

93.1 parts of MDI were charged to a reactor and heated to 45° C. 23.8 parts of POLYOL B were then added. The mixture was held at 60° C. for 2½ hours, and then cooled to room temperature. After storage at room temperature for 24 hours, crystals began forming.

The resultant product was then heated to 60° C., and 6 parts of TPG (corresponding to 4.8% by weight of the total mixture) were added. After storage at room temperature for 8 days, the product (isocyanate content of about 20.4%) remained a clear liquid.

EXAMPLES 14 AND 15

111 parts of MDI were charged to a reactor and heated to 45° C. 21.1 parts of POLYOL C were then added. The mixture was held at 60° C. for 2 hours and at 45° C. for 12 hours. After about 3 hours at room temperature, crystals began forming.

5.3 parts of TPG (3.9% by weight) were added and the mixture was heated to 60° C. The resultant product (isocyanate group content of about 23.4%) remained a clear liquid after a period of 4 days at room temperature.

EXAMPLES 16 AND 17

93 parts of MDI were charged to a reactor and heated to 45° C. 24.5 parts of POLYOL D were then added. The mixture was held at 60° C. for 2½ hours. After 24 hours at room temperature, the product was completely solid.

The solid product was heated to 60° C. and 6.2 parts of TPG (5% by weight of total mixture) were added. After 24 hours at room temperature, the product (isocyanate group content of about 20.7%) remained a clear liquid.

EXAMPLE 18

125 parts of MDI were charged to a reactor and heated to 50° C. 50.1 parts of POLYOL E were then added. The mixture was held at about 60° C. for about 90 minutes. After a period of 44 hours at room temperature, a semi-solid product formed. After an additional 18 days at room temperature, the product was in the form of a cloudy paste.

EXAMPLE 19

50 parts of MDI were added in a glass jar and heated to 45° C. 3.8 parts (corresponds to about 5.4% by weight of the total mixture) of TPG, and 16 parts of POLYOL E were added to jar and stood for 10 minutes. The mixture was then kept at 45° C. for about 3½ hours. After a period of about 30 days at room temperature, the product (having an isocyanate group content of about 19.9%) remained a clear yellow liquid.

EXAMPLE 20

28.4 parts of POLYOL F were added to 72.2 parts of MDI. The mixture was placed in a 60° C. oven for about 2 hours. The product was then removed from the oven and held at room temperature. After about 3 hours, crystals began forming. After a total of about 3 days, a semi-solid product formed.

EXAMPLE 21

72 parts of MDI were added to a glass jar and heated to 45° C. 5.5 parts of TPG (corresponding to about 5.5% by weight of the total mixture) and 23 parts of POLYOL F were then added. The jar was placed in an oven, held at 60° C. for about 75 minutes and then held at 45° C. for an additional 3½ hours. After 5 days at room temperature, the product (isocyanate content of about 19.8%) remained a clear liquid.

EXAMPLES 22–29

In these examples, various propylene glycols (other than tripropylene glycol) were used in attempts to form liquid products. The materials used, the amounts used and the results were as indicated in Table II. In each of Examples 22 through 29, the MDI was first heated to about 45° C. in a glass jar. Thereafter, the other components were added and allowed to react. The jars were then stored at room temperature.

TABLE II

| EXAMPLE | MDI PBW | POLYOL F PBW | POLYOL K PBW | POLYOL L PBW | DPG PBW | PG PBW | % by weight of POLYOL K, POLYOL L, DPG or PG | RESULT |
|---|---|---|---|---|---|---|---|---|
| 22 | 70.5 | 23 | 5.5 | — | — | — | 5.5% | After 18 days solid product resulted. |
| 23 | 63.4 | 20.7 | 24.5 | — | — | — | 22.6% | After 108 days product remained a liquid. |
| 24 | 70.5 | 23 | — | 5.5 | — | — | 5.5% | Crystal began forming after 6 days. Completely solid after 65 days. |
| 25 | 70.5 | 23 | — | 11.5 | — | — | 11% | A clear liquid with slight haze formed and did not change after 106 days. |
| 26 | 70.5 | 23 | — | — | 5.5 | — | 5.5% | A hazy product with a white suspension formed immediately. |
| 27 | 70.5 | 23 | — | — | 3.8 | — | 3.9% | Same result as Example 26. |
| 28 | 70.5 | 23 | — | — | — | 5.5 | 5.5% | A solid formed after 16 days. |
| 29 | 70.5 | 23 | — | — | — | 2.2 | 2.3% | Particles of solid formed after 17 days. Product was completely solid after 67 days. |

In Examples 23 and 25, liquids were formed, but in each instance a very large amount of the propylene glycol derivative was required.

EXAMPLE 30

95 parts of MDI and 26.3 parts of POLYOL G were mixed in a glass bottle and placed in an oven. The temperature was held at 60° C. for 3 hours and then at 45° C. for 3½ hours. After 3 days at room temperature, a solid product formed.

EXAMPLE 31

Using the identical process as set forth in Example 30, 75.1 parts of MDI, 20.8 parts of POLYOL G, and 5 parts of TP (corresponding to about 5% by weight) were used. After 21 days at room temperature, the product (having an isocyanate content of about 21.2%) remained a clear liquid.

EXAMPLE 32

Using the identical process as set forth in Example 30, 75.1 parts of MDI, 20.1 parts of POLYOL H, and 5 parts of TPG (corresponding to about 5% by weight) were used. A hazy liquid formed which remained unchanged over a period of 21 days. The product had an isocyanate content of about 20.5%.

EXAMPLE 33

250 pars of MDI were charged to a reactor and heated to 50° C. 97.5 parts of POLYOL I were then added over a 20 minute period. The temperature was then held at about 60° C. for about 2½ hours. The resultant product was solid at room temperature.

EXAMPLE 34

200 parts of MDI were added to a reactor and heated to about 50° C. First 15.3 parts of TPG (5.5%) and then 64 parts of POLYOL I were added. The mixture was held at 60° C. for about 140 minutes. The product (having an NCO content of about 20.5%) remained a cloudy liquid after storage at room temperature for 50 days.

EXAMPLE 35

Using the same procedure as in Example 34, 200 parts of MDI, 48 parts of POLYOL I and 15.3 parts of TPG (about 5.8%) were used. The product (having an NCO content of about 22.1%) remained a cloudy liquid after storage at room temperature for 50 days.

EXAMPLE 36

200 parts of MDI were added to a reactor and heated to 55° C. 64 parts of POLYOL I and then 15.3 parts of TEG were added. The mixture was held at about 60° C. for 2 hours. Within 24 hours, a solid product had formed.

EXAMPLES 37 AND 38

250 parts of MDI were added to a glass jar, and heated to about 50° C. 52.3 parts of POLYOL J were then added, and the mixture was held at 55° C. for about 2 hours. Within 48 hours at room temperature, solid particles had begun to form.

Using the identical amounts of MDI and POLYOL J, and using the same procedure, 9 parts of TPG (about 3% by weight) were added with the POLYOL J. The product (having an NCO content of about 22.7%) remained a cloudy liquid having no solids after 7 days at room temperature.

EXAMPLE 39

250 parts of MDI were added to a glass jar and heated to about 55° C. 40.3 parts of POLYOL J, followed by 9 parts of TEG were then added. The mixture was held at about 60° C. for 2 hours. After 2 days, a cloudy liquid containing about 50% solids formed.

EXAMPLES 40, 41 AND 42

101.1 parts of MDI were charged to a reactor and heated to 45° C. 19.7 parts of POLYOL M were then added The stirred mixture was held at 60° C. for 2 hours and then 45° C. for 2 hours. The product was then cooled to room temperature. After storage at room temperature for 16 hours, crystals had formed.

The resultant product was then heated to 60° C. and 4.8 parts of TPG (corresponding to 3.8% by weight of the total mixture) were added. After storage at room temperature for 4 days, the product (isocyanate content of about 20.4%) remained a clear viscous liquid.

The resultant product was then heated to 50° C., and 37.9 parts of MDI were added which afforded a prepolymer containing only 2.9% TPG. After storage at room temperature for 24 hours the product (isocyanate content of about 23.3%) remained a clear liquid.

EXAMPLES 43 AND 44

250 parts of MDI were charged to a reactor and heated to 45° C. 54.6 parts of POLYOL N were then added. The mixture was heated to 71° C. over a 15 minute period and then allowed to cool slowly to room temperature (isocyanate content of about 24.0%). After 3 days at room temperature, crystals began forming.

1832 parts of MDI were charged to a reactor and heated to 45° C. 95.7 parts of TPG were then added. The stirred mixture was held at 58° C. for 42 minutes followed by the addition of 300 parts of POLYOL N. This final mixture (containing about 4.3% by weight TPG) was held at about 62° C. for 1.75 hours then cooled to room temperature. After storage at room temperature for 6 days, the product (isocyanate content of about 22.9%) remained a liquid.

EXAMPLE 45

250 parts of MDI were charged to a reactor and heated to 55° C. 101.2 parts of POLYOL R were then added with stirring. The stirred mixture was held at 60° C. for 1.5 hours and then cooled to room temperature. Within 24 hours, a solid product had formed.

EXAMPLE 46

148.2 parts of MDI were charged to a reactor and heated to 55° C. A mixture of 60 parts of POLYOL R and 12.4 parts of TPG (corresponding to 5.6% by weight of the total mixture) were then added with stirring. The stirred mixture was held at 60° C. for 1.5 hours then cooled to room temperature to afford a cloudy liquid (isocyanate content of about 19.2%). After storage at room temperature for 60 days, the product remained a cloudy liquid.

EXAMPLE 47

125 pars of MDI were charged to a reactor and heated to 55° C. 61 parts POLYOL O were then added with stirring. The stirred mixture was held at 60° C. for 1.5 hours and then cooled to room temperature. Within 24 hours, 90% of the product had solidified.

EXAMPLE 48

125 parts of MDI were charged to a reactor and heated to 55° C. 36. parts of POLYOL O and 9.6 parts of TPG (corresponding to 5.6% by weight of the total mixture) were then added with stirring. The reaction mixture was held at 60° C. for 1.5 hours then cooled to room temperature to give a cloudy liquid (isocyanate content of about 21.0%). After storage at room temperature for 60 days the product remained a cloudy liquid.

EXAMPLE 49

125 parts of MDI were charged to a reactor and heated to 60° C. 62.9 parts of POLYOL Q were then added with stirring. The stirred mixture was held at 60° C. for 1.5 hours and then cooled to room temperature. Within 24 hours a solid product had formed.

EXAMPLE 50

125 parts of MDI were charged to a reactor and heated to 60° C. 37.8 parts of POLYOL Q and 9.7 parts of TPG (corresponding to 5.6% by weight of the total mixture) were then added with stirring. The reaction mixture was held at 60° C. for 1.5 hours then cooled to room temperature to afford a clear liquid (isocyanate content of about 21.0%). After storage at room temperature for 60 days the product remained a clear liquid.

The following Table gives the results using POLYOLS J, P, T AND W using the identical procedure defined in Examples 49 and 50 above.

TABLE III

| Example # | Polyol | Formulation (parts) MDI | Polyol | TPG | Prepolymer % NCO | Prepolymer Physical Appearance After 24 hours At Room Temp. | Prepolymer Physical Appearance After 60 days at Room Temp. |
|---|---|---|---|---|---|---|---|
| 51 | S | 125 | 39.7 | — | 25.0 | Solid | — |
| 52 | S | 125 | 39.7 | 10.5(6%) | 20.2 | — | Clear liquid |
| 53 | P | 125 | 61 | — | 21.6 | 90% solid | — |
| 54 | P | 125 | 36.8 | 10.3(6%) | 20.9 | — | Clear liquid |
| 55 | T | 125 | 66.5 | — | 21.3 | Solid | — |
| 56 | T | 125 | 39.7 | 10.5(6%) | 20.7 | — | Clear liquid |
| 57 | W | 125 | 65 | — | 21.4 | 90% solid | — |
| 58 | W | 125 | 38.9 | 10.5(6%) | 20.9 | — | Clear liquid |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an isocyanate which is both stable and liquid at 25° C. comprising reacting
   (i) diphenylmethane diisocyanate,
   (ii) an organic material containing two or more hydroxy groups, and having a molecular weight of from 226 to 6000, said organic material forming a product solid at 25° C. when reacted with diphenylmethane diisocyanate in an amount such that the resultant solid product would have an isocyanate group content of from 10 to 30% by weight, and
   (iii) from 1 to 6% by weight, based on the combined weight of (i), (ii) and (iii), of tripropylene glycol, the amounts of components (i), (ii) and (iii) being such that the resultant product has an isocyanate group content of from 10 to 30% by weight.

2. The process of claim 1 wherein the components are reacted at a temperature of from about 20° C. to about 110° C.

3. The process of claim 2 wherein the components are reacted at a temperature of from about 40° C. to about 80° C.

4. The process of claim 3, wherein the components are reacted at a temperature of from about 50° C. to about 70° C.

5. The process of claim 1, wherein the isocyanate group content of the liquid product is from about 20 to about 30% by weight.

6. The process of claim 5, wherein the isocyanate group content of the liquid product is from about 20 to about 25% by weight.

7. The product produced by the process of claim 1.

* * * * *